(12) United States Patent
Kim

(10) Patent No.: US 7,486,360 B2
(45) Date of Patent: Feb. 3, 2009

(54) LIQUID CRYSTAL DISPLAY

(75) Inventor: Sang-Il Kim, Gyeonggi-do (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 436 days.

(21) Appl. No.: 11/325,279

(22) Filed: Jan. 3, 2006

(65) Prior Publication Data

US 2006/0250551 A1    Nov. 9, 2006

(30) Foreign Application Priority Data

May 3, 2005   (KR) ................. 10-2005-0037137

(51) Int. Cl.
*G02F 1/1335* (2006.01)
(52) U.S. Cl. .............. 349/114; 349/113; 349/138; 349/139; 349/143; 349/144; 349/147; 349/38
(58) Field of Classification Search ........... 349/113, 349/138, 139, 143, 144, 147, 38, 39, 99, 349/114
See application file for complete search history.

(56) References Cited

U.S. PATENT DOCUMENTS

| | | | |
|---|---|---|---|
| 6,414,729 B1 * | 7/2002 | Akiyama et al. | 349/38 |
| 6,788,363 B2 | 9/2004 | Liu et al. | |
| 6,831,715 B2 | 12/2004 | Ikeno et al. | |
| 2004/0075791 A1 | 4/2004 | Liu | |
| 2006/0250551 A1 * | 11/2006 | Kim | 349/114 |
| 2007/0019142 A1 * | 1/2007 | Roh et al. | 349/138 |
| 2007/0242014 A1 * | 10/2007 | Lee et al. | 345/88 |
| 2007/0268434 A1 * | 11/2007 | Huang et al. | 349/129 |

FOREIGN PATENT DOCUMENTS

| | | |
|---|---|---|
| JP | 2003-167253 | 6/2003 |
| JP | 2003-177384 | 6/2003 |
| JP | 2003-295177 | 10/2003 |
| JP | 2004-085918 | 3/2004 |
| JP | 2004-157510 | 6/2004 |
| KR | 1020020089008 | 11/2002 |
| KR | 1020030011984 | 2/2003 |
| KR | 1020030047851 | 6/2003 |
| KR | 1020030058012 | 7/2003 |
| KR | 1020040073460 | 8/2004 |
| KR | 1020040092483 | 11/2004 |

* cited by examiner

*Primary Examiner*—Brian M Healy
(74) *Attorney, Agent, or Firm*—F. Chau & Associates, LLC

(57) ABSTRACT

An LCD includes a first substrate, a transparent electrode formed on the first substrate, a coupling electrode connected to the transparent electrode, a reflective electrode formed on the first substrate and separated from the transparent electrode, an auxiliary electrode formed on the first substrate and connected to the reflective electrode where the auxiliary electrode overlaps the coupling electrode with an interposing dielectric layer, a second substrate facing the first substrate, and a protrusion formed on the second substrate. The LCD utilizes the protrusion formed at a reflective area and an auxiliary capacitor connected to a reflective capacitor in series to accord compatible reflectance and transmittance curves for the reflection area and the transmission area having the same cell gaps. As a result, the light efficiency of the LCD becomes higher and the viewing angle of the LCD becomes wider.

27 Claims, 7 Drawing Sheets

LIQUID CRYSTAL DISPLAY

BACKGROUND OF THE INVENTION (a) Field of the Invention

The present invention relates to a liquid crystal display and, more particularly, to a transflective liquid crystal display.

(b) Description of the Related Art

Generally, a liquid crystal display (LCD) includes a pair of panels individually having electrodes formed on their inner surfaces, and a dielectric anisotropy liquid crystal layer interposed between the panels. Two polarizers are individually provided on the outer surfaces of the panels. In the LCD, a variation in the strength of an electric field generated by the electrodes changes the orientations of liquid crystal molecules in the liquid crystal layer, and the orientations of the liquid crystal molecules determine the polarization of light passing through the liquid crystal layer. At this time, the polarizers either pass or block the polarized light to produce white (or clear) or black (or dark) regions. As a result, a desired image display is realized.

LCDs are categorized as non-emissive displays, and in that respect, they do not produce any form of light. Accordingly, the LCDs utilize artificial light emitted from lamps of a backlight unit separately provided, or ambient light, as a light source.

Depending on the kinds of the light source used for image display, the LCDs are divided into three types: transmissive, reflective, and transreflective LCDs. In transmissive LCDs, the pixels are illuminated from behind using a backlight. In reflective LCDs, the pixels are illuminated from the front using incident light originating from the ambient environment. Transflective LCDs combine transmissive and reflective characteristics. Under medium light conditions, such as an indoor environment, or under complete darkness conditions, these LCDs are operated in a transmissive mode, while under very bright conditions, such as an outdoor environment, they are operated in a reflective mode. The reflective and transflective LCDs are commonly used in small and medium size display devices.

In a transflective LCD, there are transmission areas and reflection areas. In the reflection areas exterior light passes through the liquid crystal layer twice because of reflection, while in the transmission areas light emitted from the backlight provided behind an LCD panel assembly passes through the liquid crystal layer only once. Due to these characteristics, a gamma curve for the transmission areas and a gamma curve for the reflection areas do not coincide with each other. As a result, images are displayed differently in the transmission areas and the reflection areas.

There are some methods to solve the above-mentioned problem. One method is to form different thicknesses (i.e., cell gap) for the transmission areas and the reflection areas. Another method is to provide different voltages when the LCD operates in a transmissive mode that mainly uses the transmission areas and in a reflective mode that mainly uses the reflection areas.

However, the former method has some drawbacks. The manufacturing process becomes complex since a process to form a thick layer in the reflection areas is added. Also, problematic alignment of the liquid crystal layer, such as disclination and/or incidental images may occur due to a large stage difference generated at the boarders of the two areas. Furthermore, as the voltages applied to the reflective electrodes become larger, the luminance of the reflective electrodes becomes lower. Meanwhile, in the latter method, auxiliary capacitors are provided in the reflection areas to lower the voltages applied to the pixels. In this way, the problems of the former method can be resolved. However, the threshold voltages Vth of the two areas become different, so that a problem arises that the gamma curves of the two modes do not coincide with each other. Accordingly, the images displayed by the two modes are shown differently.

Meanwhile, the LCDs have a drawback that a standard viewing angle, based on the contrast ratio exceeding a predetermined level, is not very wide. The narrow standard viewing angle was a small matter since the transflective LCDs had been commonly used in the medium and small size display devices as mentioned in the above. However, recently, since the medium and small display devices are used in more applications, demands for the wide viewing angle are tending upwards in the field of LCDs.

Various methods have been proposed to enlarge the standard viewing angle of the LCD. A widely used method is to vertically align the liquid crystal layer to two panels and to form apertures or protrusions on the field generating electrodes. Another method is to control tilt directions of the liquid crystal molecules in various ways when an electric field is generated in the liquid crystal layer.

However, when these methods are applied to the transflective LCD that is commonly employed in the medium and small display devices, an additional process is required to form the apertures in the electric field generating electrodes. Further, it is not very easy to form the apertures in the pixels accurately because the pixels are too small, and even when the apertures are formed, the light efficiency, nevertheless, is not very high.

SUMMARY OF THE INVENTION

An objective of the present invention is to provide a technique capable of according two compatible gamma curves for reflection and transmission areas that both have substantially the same cell gaps in order to produce an LCD with higher light efficiency and a wider viewing angle.

To achieve the objective, according to an aspect of the present invention, there is provided an LCD comprising: a first substrate; a transparent electrode formed on the first substrate; a coupling electrode formed on the first substrate and connected to the transparent electrode; a reflective electrode formed on the first substrate and separated from the transparent electrode; an auxiliary electrode formed on the first substrate and connected to the reflective electrode where the auxiliary electrode overlaps the coupling electrode with a dielectric layer interposed therebetween; a second substrate facing the first substrate; and a protrusion formed on the second substrate.

In this structure, the protrusion may be formed in areas of the second substrate facing and opposite to the reflective electrode on the first substrate.

The reflective electrode may be formed wider than the protrusion, and it may symmetrically divide the entire transparent electrode or a partial portion of the transparent electrode.

An insulating layer, formed between the coupling electrode and the auxiliary electrode, may be further included in the LCD, the insulating layer being the dielectric layer interposed between the auxiliary electrode and the coupling electrode.

Also, a switching element, formed on the first substrate and connected to the coupling electrode through its output terminal electrode, may be further included in the LCD.

According to another aspect of the present invention, there is provided an LCD comprising: a first panel having a reflective electrode and a transparent electrode; a second panel facing the first panel; an LC layer interposed between the first panel and the second panel; and an element formed in the second panel for defining tilt direction of LC molecules in the LC layer, which is included in the second panel.

Here, the reflective electrode and the transparent electrode are separated from each other.

The transparent electrode and the reflective electrode may receive different voltages.

An auxiliary capacitor, connected to the reflective electrode and the transparent electrode, may be further included in the LCD.

The tilt direction-defining element may include at least a protrusion pattern, and the protrusion pattern may include a first protrusion and a second protrusion that extend along the same direction as the reflective electrode. The tilt direction-defining element may be formed in areas of the second panel facing and opposite to the reflective electrode on the first panel.

According to still another aspect of the present invention, there is provided an LCD comprising a plurality of pixels.

Each pixel includes: an LC layer; a transmissive LC capacitor; a reflective LC capacitor separated from the transmissive LC capacitor; and a tilt direction-defining element that determines tilt direction of LC molecules in the LC layer.

In this structure, a voltage across the transmissive LC capacitor is different from a voltage across the reflective LC capacitor.

The tilt direction-defining element may include at least a protrusion pattern, and the voltage across the transmissive LC capacitor may be higher than the voltage across the reflective LC capacitor.

An auxiliary capacitor, connected to the reflective LC capacitor, may be further included in the LCD.

The LCD may be further comprised of a switching element connected to the transmissive LC capacitor and the auxiliary capacitor. The transmissive LC capacitor may receive a data voltage from the switching element, while the reflective LC capacitor may receive a voltage lower than the data voltage from the auxiliary capacitor.

The transmissive LC capacitor may include a transparent electrode, connected to the switching element, and a common electrode that receives a common voltage, while the reflective LC capacitor may include a reflective electrode, separated from the transparent electrode, and the common electrode.

The auxiliary capacitor may be formed by overlapping at least one of the transparent electrode and an output terminal electrode of the switching element that is connected to the transparent electrode, with either the reflective electrode or an auxiliary electrode connected to the reflective electrode.

According to still another aspect of the present invention, there is provided an LCD comprising: a first substrate; a gate line formed on the first substrate; a first insulating layer formed on the gate line; a data line formed on the first insulating layer; a drain electrode that is formed on the first insulating layer, while being separated from the data line; a second insulating layer that is formed on the data line and the drain electrode and is provided with a first contact hole; a transparent electrode that is formed on the second insulating layer, while being connected to the drain electrode through the first contact hole; an auxiliary electrode formed on the first substrate and overlapping at least one of the transparent electrode and the drain electrode; a reflective electrode that is connected to the auxiliary electrode, while being separated from the transparent electrode; a second substrate facing the first substrate; and a protrusion pattern that is formed on the second substrate and is formed in areas of the second substrate facing and opposite to the reflective electrode.

In this structure, the auxiliary electrode may underlie the first insulating layer.

The first and second insulating layers may be provided with a second contact hole, through which the auxiliary electrode is exposed, and the reflective electrode may be connected to the auxiliary electrode through the second contact hole.

The drain electrode has an aperture, and the second contact hole may be formed to penetrate the aperture.

A top surface of the second insulating layer may be uneven.

The protrusion pattern may include a first protrusion and a second protrusion that extend along the same direction as the reflective electrode, and it may be formed as a bar with a funnel-shaped end.

A common electrode, formed on the protrusion pattern, may be further included in the LCD.

BRIEF DESCRIPTION OF THE DRAWINGS

The above objects and other advantages of the present invention will become more apparent by describing the preferred embodiments thereof in more detail with reference to the accompanying drawings.

DETAILED DESCRIPTION OF THE PREFERRED EMBODIMENTS

Figure 1:
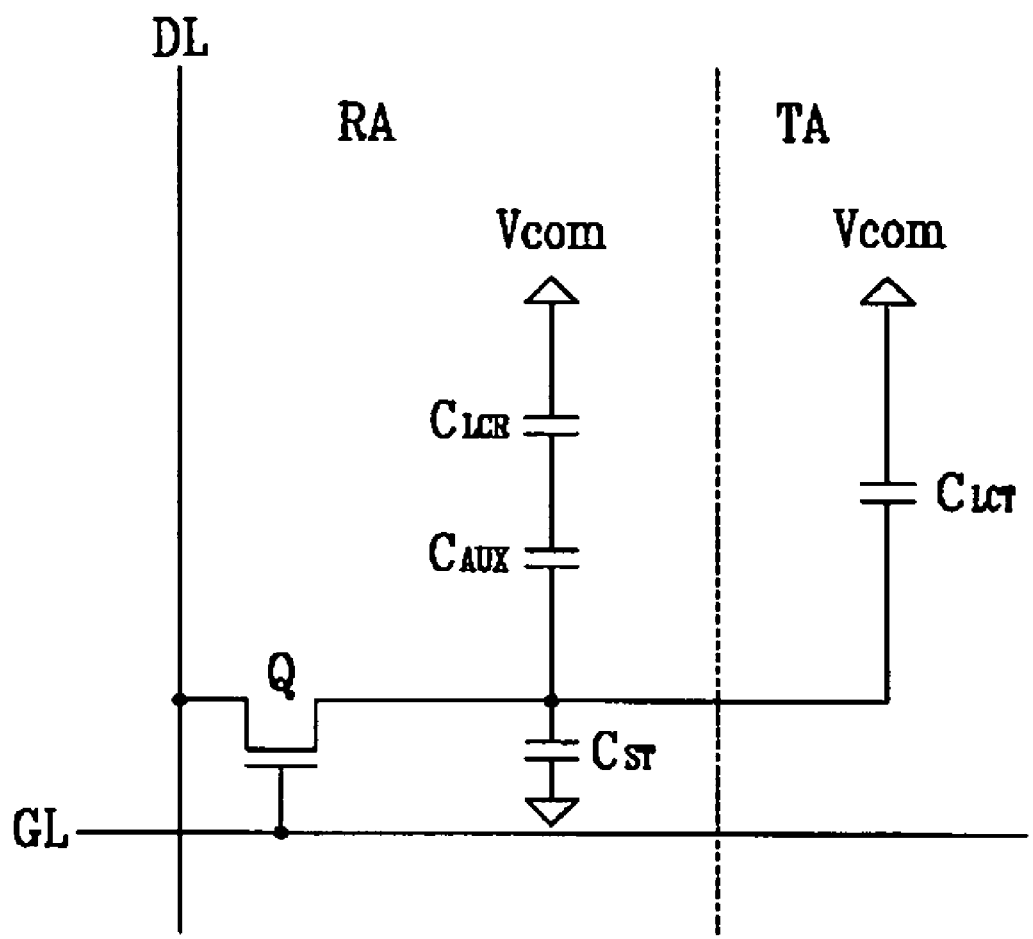
FIG. 1 is an equivalent circuit diagram of a pixel of an LCD according to an embodiment of the present invention.

Preferred embodiments of the present invention will now be described more fully hereinafter with reference to the accompanying drawings, in which preferred embodiments of the invention are shown. The present invention may, however, be embodied in different forms and should not be construed as being limited to the embodiments set forth herein. Rather, these embodiments are provided so that this disclosure will be thorough and complete, and will fully convey the scope of the invention to those skilled in the art.

In the drawings, the thickness of the layers, films, and regions are exaggerated for clarity. Like numerals refer to like elements throughout. It will be understood that when an element such as a layer, film, region, or substrate is referred to as being "on" another element, it can be directly on the other element or intervening elements may also be present.

Figure 2:
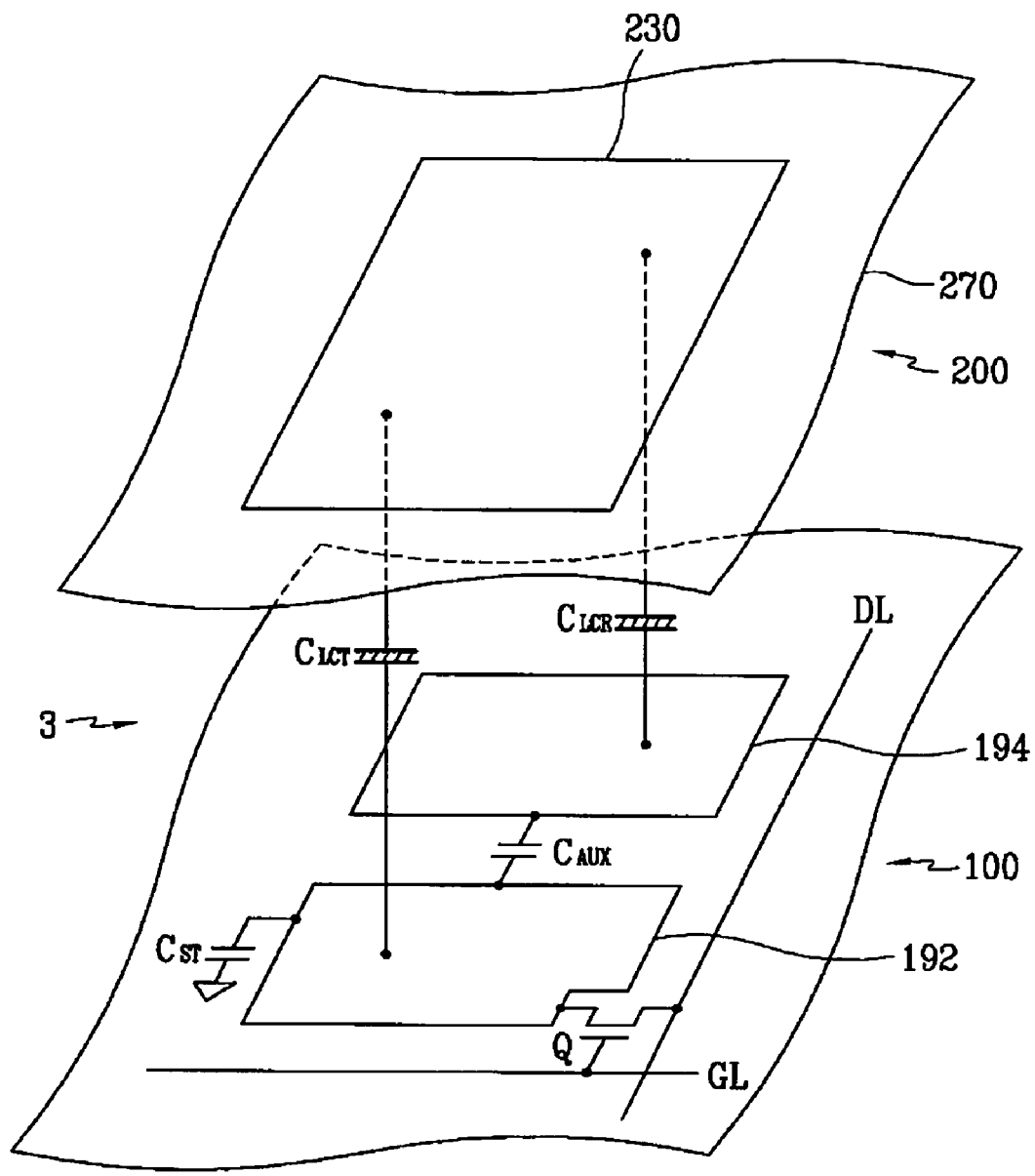
FIG. 2 is a schematic of a pixel of an LCD according to an embodiment of the present invention.

FIG. 1 is an equivalent circuit diagram of a pixel of an LCD according to an embodiment of the present invention, and FIG. 2 is a schematic of a pixel of an LCD according to an embodiment of the present invention.

As shown in FIG. 1 and FIG. 2, an LCD according to an embodiment of the present invention includes a plurality of pixels connected to a plurality of display signal lines GL and DL. The pixels are arranged substantially in a matrix. In the structure of FIG. 2, the LCD comprises an underlying TFT array panel 100 and an overlying common electrode panel 200 facing each other, and an LC layer 3 interposed therebetween. The display signal lines GL and GD are provided on the TFT array panel 100, and include a plurality of gate lines GL for transmitting gate signals (also referred to as "scanning signals"), and a plurality of data lines DL for transmitting data signals. The gate lines GL extend substantially in a row direction and substantially parallel to each other, while the data lines DL extend substantially in a column direction and substantially parallel to each other.

As shown in FIG. 1, each pixel includes a switching element Q that is connected to one of the gate lines GL and one of the data lines DL, and a transmissive LC capacitor $C_{LCT}$, an auxiliary capacitor $C_{AUX}$, and a storage capacitor $C_{ST}$, which are connected to the switching element Q. The pixel further includes a reflective LC capacitor $C_{LCR}$ that is connected to the auxiliary capacitor $C_{AUX}$. The storage capacitor $C_{ST}$ may be omitted in other embodiments.

The switching element Q, such as a thin film transistor (TFT), is provided on the TFT array panel 100 and has three terminals: a control terminal connected to one of the gate lines GL; an input terminal connected to one of the data lines DL; and an output terminal connected to the transmissive LC capacitor $C_{LCT}$, the auxiliary capacitor $C_{AUX}$, and the storage capacitor $C_{ST}$.

As shown in FIG. 2, the transmissive LC capacitor $C_{LCT}$ includes a transparent electrode 192, provided on the TFT array panel 100, and a common electrode 270, provided on the common electrode panel 200, as two terminals. The LC layer 3 interposed between the two electrodes 192 and 270 functions as a dielectric of the transmissive LC capacitor $C_{LCT}$. The transparent electrode 192 is connected to the switching element Q, and the common electrode 270 receives a common voltage $V_{com}$, and covers the entire surface of the common electrode panel 200. In other embodiments, the common electrode 270 may be provided on the TFT array panel 100. In this case, at least one of the transparent electrode 192 and the common electrode 270 may be shaped as a bar or a stripe.

The reflective LC capacitor $C_{LCR}$ includes a reflective electrode 194, provided on the TFT array panel 100, and a common electrode 270, provided on the common electrode panel 200, as two terminals. The LC layer 3 interposed between the two electrodes 194 and 270 functions as a dielectric of the reflective LC capacitor $C_{LCR}$. The reflective electrode 194 is connected to the auxiliary capacitor $C_{AUX}$, while being separated from the transparent electrode 192.

The auxiliary capacitor $C_{AUX}$ is formed by overlapping the reflective electrode 194 and a conductor that is connected to the reflective electrode 194 with at least one of the transparent electrode 192 and a conductor that is connected to the transparent electrode 192, interposing an insulator therebetween. The auxiliary capacitor $C_{AUX}$ lowers a voltage applied from the switching element Q to the reflective LC capacitor $C_{LCR}$. Accordingly, a voltage across the reflective LC capacitor $C_{LCR}$ becomes smaller than a voltage across the transmissive LC capacitor $C_{LCT}$.

In a transreflective LCD, each pixel is divided into a transmission area TA defined by the transparent electrode 192 and a reflection area RA defined by the reflective electrode 194. In the transmission area light emitted from a backlight (not shown) provided behind an LCD panel assembly passes through the LC layer 3 only once, while in the reflection area RA exterior light passes through the LC layer 3 twice because of reflection, in order to display desired images.

The storage capacitor $C_{ST}$ functions as an auxiliary capacitor for both the transmissive LC capacitor $C_{LCT}$ and the reflective LC capacitor $C_{LCR}$. When a storage electrode (not shown), which is provided on the TFT array panel 100, and a transparent electrode 192 or a conductor that is connected to the transparent electrode 192, are overlapped with each other, with an insulator interposed therebetween, the overlap portion becomes the storage capacitor $C_{ST}$. The storage electrode receives a predetermined voltage such as the common voltage $V_{com}$. Alternately, the storage capacitor $C_{ST}$ may be formed by overlapping of the transparent electrode 192 and a previous gate line that is placed directly on the transparent electrode 190, with an insulator interposed therebetween.

Hereinafter, the structure of the LCD according to an embodiment of the present invention will be described in detail with reference to FIG. 3 through FIG. 5.

Figure 3:
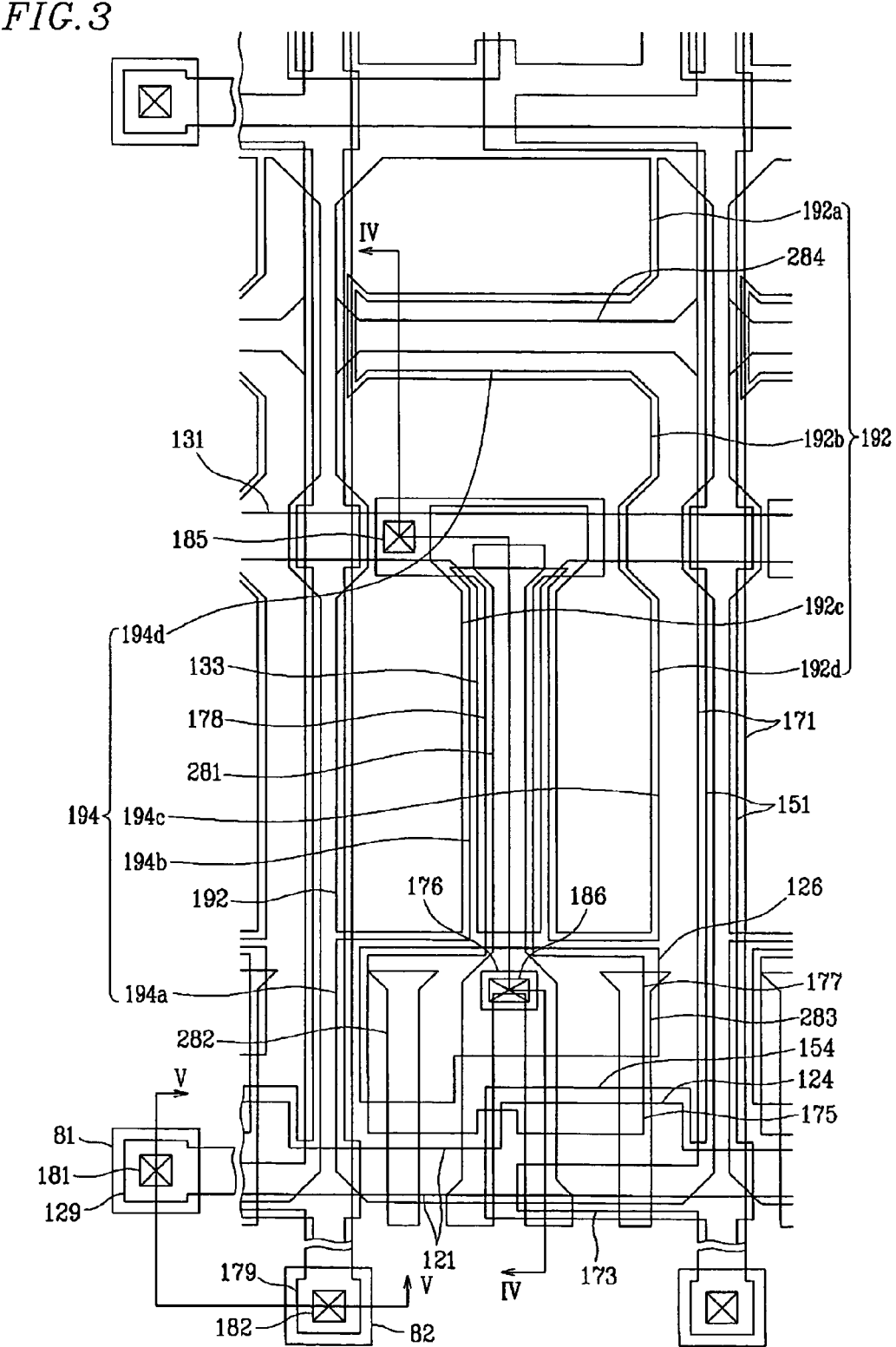
FIG. 3 is a layout view of an LCD according to an embodiment of the present invention.
Figure 4:
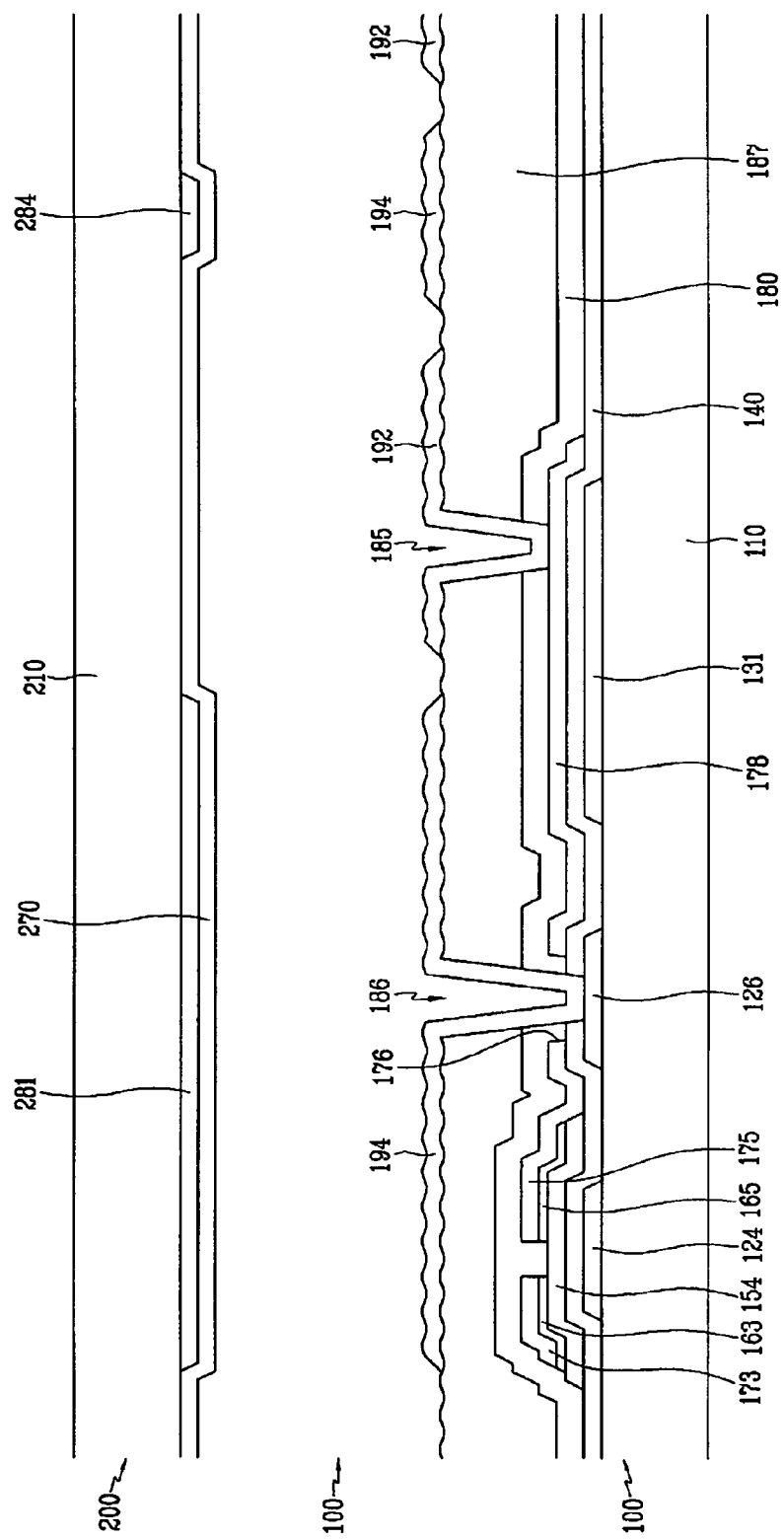
FIG. 4 is a cross-sectional view cut along IV-IV' of FIG. 3.
Figure 5:
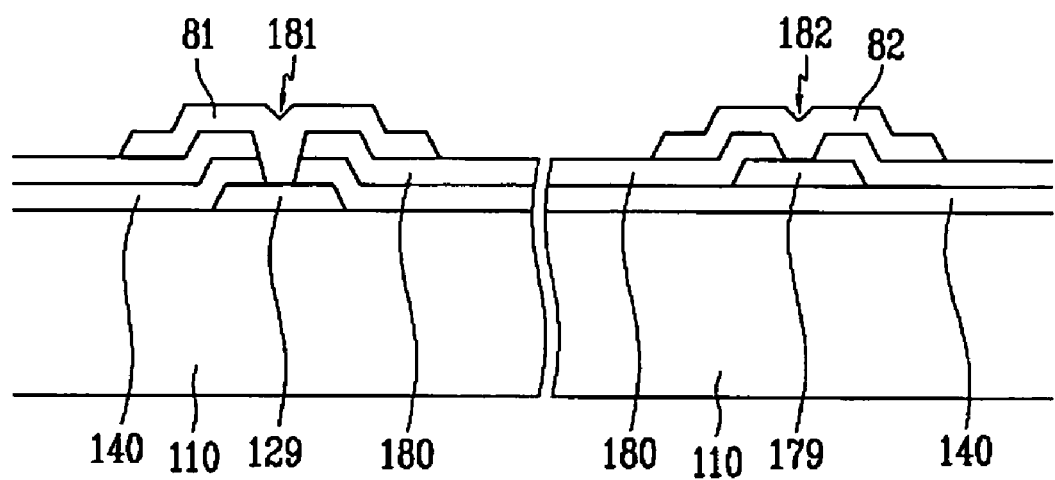
FIG. 5 is a cross-sectional view cut along V-V' of FIG. 3.

FIG. 3 is a layout view of an LCD according to an embodiment of the present invention, and FIG. 4 and FIG. 5 are cross-sectional views cut along IV-IV' and V-V' of FIG. 3, respectively.

The LCD of this embodiment includes a TFT array panel 100 and a common electrode panel 200 facing each other, and a liquid crystal layer 3 interposed therebetween.

The TFT array panel 100 is configured as follows.

A plurality of gate conductors, including a plurality of gate lines 121, a plurality of storage electrode lines 131, and a plurality of auxiliary electrodes 126, are formed on an insulating substrate 110 made of transparent glass or plastic.

The gate lines 121 for transmitting gate signals extend substantially in a horizontal direction. Each gate line 121 includes a plurality of gate electrodes 124 protruding upward and an end portion 129 having a relatively large dimension to be connected to a different layer or an external device. Gate drivers (not shown) for generating the gate signals may be mounted on a flexible printed circuit film (not shown) attached to the substrate 110, or directly on the substrate 110. Otherwise, the gate drivers may be integrated into the substrate 110. In this case, the gate lines 121 are directly connected to the gate drivers.

Each storage electrode line 131 extends substantially in a horizontal direction and includes a plurality of expansions 137 protruding downward. The storage electrode lines 131 receive a predetermined voltage such as a common voltage.

Each auxiliary electrode 126 is shaped as a vertically long rectangular with a partially downward protruding portion. The gate lines 121 and the storage electrode lines 131 are separated from each other.

The gate conductors 121, 126, and 131 may be made of an aluminum—(Al) containing metal such as Al and an Al alloy, a silver—(Ag) containing metal such as Ag and a Ag alloy, a copper—(Cu) containing metal such as Cu and a Cu alloy, a molybdenum—(Mo) containing metal such as Mo and a Mo alloy, chrome (Cr), titanium (Ti), or tantalum (Ta). They may be configured as a multi-layered structure, in which at least two conductive layers (not shown) having different physical properties are included. In this case, one of the two layers is made of a low resistivity metal, such as an Al-containing metal, an Ag-containing metal, a Cu-containing metal, or the like, in order to reduce delay of the signals or voltage drop. The other is made of a material having prominent physical, chemical, and electrical contact properties with other materials such as indium tin oxide (ITO) and indium zinc oxide (IZO), etc. For example, Mo-containing metals, Cr, Ta, Ti, etc., may be used for the formation of the same layer. Desirable examples of the combination of the two layers are a lower Cr layer and an upper Al (or Al alloy) layer, and a lower Al (or Al alloy) layer and an upper Mo (or Mo alloy) layer. Besides the above-listed materials, various metals and conductors can be used for the formation of the gate lines 121, the storage electrode lines 131, and the auxiliary electrodes 126.

All lateral sides of the gate lines 121, the storage electrode lines 131, and the auxiliary electrodes 126 preferably slope in the range from about 30° to 80° to the surface of the substrate 110.

A gate insulating layer 140 made of nitride silicon (SiNx) or silicon oxide ($SiO_2$) is formed on the gate lines 121, the storage electrode lines 131, and the auxiliary electrodes 126.

A plurality of linear semiconductors 151 made of hydrogenated amorphous silicon (abbreviated as "a-Si") or polysilicon are formed on the gate insulating layer 140. Each linear semiconductor 151 extends substantially in a vertical direction, including a plurality of projections 154 that extend along the respective gate electrodes 124. The linear semiconductors 151 are enlarged in the vicinities of the gate lines 121 and the storage electrode lines 131 to cover them widely.

A plurality of linear ohmic contacts 161 and island-shaped ohmic contacts 165 are formed on the linear semiconductors 151. The ohmic contacts 161 and 165 may be made of N+ hydrogenated amorphous silicon that is highly doped with N-type impurities such as phosphorus (P), or silicide. The linear ohmic contacts 161 include a plurality of projections 163. A set of the projection 163 and the island-shaped ohmic contact 165 are placed on the projection 154 of the semiconductor 151.

All lateral sides of the semiconductors 151 and 154 and the ohmic contacts 161 and 165 slope in the range from about 30° to 80° to the surface of the substrate 110.

A plurality of data conductors, including a plurality of data lines 171 and a plurality of drain electrodes 175, are formed on the ohmic contacts 161 and 165 and the gate insulating layer 140.

The data lines 171 for transmitting data signals extend substantially in a vertical direction to be crossed with the gate lines 121 and the storage electrode lines 131. Each data line 171 includes a plurality of source electrodes 173 extending toward the respective gate electrodes 124, and an end portion 179 having a relatively large dimension to be connected to a different layer or an external device. Data drivers (not shown) for generating the data signals may be mounted on a flexible printed circuit film (not shown) attached to the substrate 110, or directly on the substrate 110. Otherwise, the data drivers may be integrated into the substrate 110. In this case, the data lines 171 are directly connected to the gate drivers.

The drain electrodes 175 separated from the data lines 171 are opposite to the source electrodes 173, centering on the gate electrodes 124. Each drain electrode 175 includes an expansion 177 having a relatively large dimension and an extension 178 extending from the expansion 177. The expansions 177 of the drain electrodes 175 are overlapped with the auxiliary electrodes 126. Each expansion 177 will be referred as a "coupling electrode". Each coupling electrode 177 is provided with a contact hole 176. The extensions 178 of the drain electrodes 175 extend along the respective storage electrode lines 133. Each extension 178 includes a vertical part overlapped with the storage electrode 133 and a horizontal part that extends along the storage electrode line 131 from an extremity of the vertical part, while being overlapped therewith.

A gate electrode 124, a source electrode 173, a drain electrode 175, and a projection 154 of the semiconductor 151 form a thin film transistor (TFT). A TFT channel is formed in the projection 154 provided between the source electrode 173 and the drain electrode 175.

The data lines 171 and the drain electrodes 175 are preferably made of a refractory metal, such as Mo, Cr, Ta, or Ti, or alloys thereof, and may be configured as a multi-layered structure including a refractory metal layer (not shown) and a low resistivity conductive layer (not shown). A desirable example of the multi-layered structure is a lower layer made of one among Cr, Mo, and a Mo alloy and an upper layer made of Al or an Al alloy. Another example is a lower layer made of Mo or a Mo alloy, an intermediate layer made of Al or an Al alloy, and an upper layer made of Mo or a Mo alloy. Besides the above-listed materials, various metals and conductors can be used for the formation of the data lines 171 and the drain electrodes 175.

All lateral sides of the data lines 171 and the drain electrodes 175 preferably slope in the range from about 30° to 80° to the surface of the substrate 110.

The ohmic contacts 161 and 165 exist only between the underlying semiconductors 151 and the overlying data lines 171 and between the overlying drain electrodes 175 and the underlying semiconductors 151, in order to reduce contact resistance therebetween. Most portions of the linear semiconductors 151 are formed more narrowly than the data lines 171, but partial portions thereof are enlarged in the vicinities of places to be crossed with the gate lines 121 and the storage electrode lines 131, as previously mentioned, in order to prevent the data lines 171 and the storage electrode lines 131 from being shorted. The linear semiconductors 151 are partially exposed at places where the data lines 171 and the drain electrodes 175 do not cover them, as well as between the source electrodes 173 and the drain electrodes 175.

A passivation layer 180 is formed on the data lines 171, the drain electrodes 175, and the exposed portions of the semiconductors 151. The passivation layer 180 is made of an inorganic insulator such as SiNx or $SiO_2$.

An organic insulating layer 187 made of an organic insulator is formed on the passivation layer 180. A desirable insulator for the formation of the organic insulating layer 187 has a low dielectric constant of below 4.0, and/or photosensitivity. The organic insulating layer 187 has an uneven top surface. On the end portions 129 of the gate lines 121 and the end portions 179 of the data lines 171, only the passivation layer 180 exists since the organic insulating layer 187 is removed.

The passivation layer 180 is provided with a plurality of contact holes 182, through which the end portions 179 of the data lines 171 are exposed. A plurality of contact holes 181 are formed in the passivation layer 180 and the gate insulating layer 140, and the end portions 129 of the gate lines 121 are exposed therethrough. A plurality of contact holes 185 are formed in the passivation layer 180 and the organic insulating layer 187, and the extensions 178 of the drain electrodes 175 are exposed therethrough. A plurality of contact holes 186 are formed in the passivation layer 180 and the organic insulating layer 187 and the auxiliary electrodes 126 are exposed therethrough.

A plurality of transparent electrodes 192 and a plurality of reflective electrodes 194 are formed on the organic insulating layer 187. A plurality of contact assistants 81 and 82 are formed on the passivation layer 180.

The transparent electrodes 192 are made of a transparent conductor such as ITO or IZO, and the reflective electrodes 194 are made of a reflective conductor such as Al, Cr, Ag, or alloys thereof.

The transparent electrodes 192 and the reflective electrodes 194 are separated from each other and have uneven top surfaces formed along the uneven surface of the organic insulating layer 187. The uneven patterns of the reflective electrodes 194 enhance reflective characteristics of the reflective electrode 194 to reflect incident light originating from the ambient environment. Hereinafter, a set of the transparent electrode 192 and the reflective electrode 194 will be referred as a "pixel electrode".

Each transparent electrode 192 is divided into a lower part and an upper part, centering the storage electrode line 131, and both of its vertical sides are constricted inwardly as much as a trapezoid-shaped dimension at a barrier of the two parts. Each reflective electrode 194 bisects the upper part of the transparent electrode 192 in the horizontal direction, but the divided parts 192a and 192b are connected to each other at the left side. The lower part of the transparent electrode 192 is also divided into two parts, a left part 192c and a right part 192d, by the reflective electrode 194 and the storage electrode 133, and top ends of the divided parts are connected to the upper part of the transparent electrode 192. A left top corner of the upper part of the transparent electrode 192 is slantingly chamfered, and other portions touching with the reflective electrode 194 are also slantingly chamfered along an outline of the reflective electrode 194.

Each reflective electrode 194 includes: an expansion 194a that completely covers an area ranging from a top side of the auxiliary electrode 126 to a bottom side of the gate line 121 positioned under the same auxiliary electrode 126, within two adjacent data lines 171; a central vertical line 194b extending along the storage electrode 133; a right vertical line 194c extending along the data line 171; and a horizontal line 194d traversing the upper part of the transparent electrode 192. The central vertical line 194b of the reflective electrode 194 is formed more widely than the storage electrode 133 and the extension 178 of the drain electrode 175 to cover all of them. This central vertical line 194c divides the lower part of the transparent electrode 192 into right and left transmission areas 192c and 192d. The horizontal line 194d divides the upper part of the transparent electrode 192 into two transmission areas 192a and 192b. Most corners of the reflective electrode 194 are slantingly chamfered, and the right vertical line 194c is partially bent to the left in the form of a trapezoid, in the vicinity of the storage electrode line 131. A top end of the central vertical line 194b and a left end of the horizontal line 194d of the reflective electrodes 194 are shaped as funnels.

The reflective electrodes 194 are overlapped with the gate lines 121 to obtain higher reflectance. Also, the transparent electrodes 192 and the reflective electrodes 194 are partially overlapped with the adjacent data lines 171 to obtain a higher aperture ratio and reflectance. However, these overlaps may be omitted.

The transparent electrodes 192 are physically and electrically connected to the extensions 178 of the drain electrodes 175 through the contact holes 185 in order to receive data voltages from the drain electrodes 175. A transparent electrode 192 and a common electrode 270 form a transmissive LC capacitor $C_{LCT}$ capable of storing the applied voltage after the TFT is turned off.

The reflective electrodes 194 are connected to the auxiliary electrodes 126 through the contact holes 186. The auxiliary electrodes 126 are overlapped with the coupling electrodes 177 with the gate insulating layer 140 interposed therebetween. An auxiliary electrode 126 and a coupling electrode 177, with the gate insulating layer functioning as the dielectric, form an auxiliary capacitor $C_{AUX}$. A reflective electrode 194 and a common electrode 270, with the liquid crystal 3, form a reflective LC capacitor $C_{LCR}$. The auxiliary capacitor $C_{AUX}$ lowers a data voltage supplied from the drain electrode 175 and then transmits the lowered voltage to the reflective LC capacitor $C_{LCR}$.

A storage capacitor $C_{ST}$ is implemented by overlapping the extension 178 of the drain electrode 175 with the storage electrode line 131 and the storage electrode 133. The storage capacitor $C_{ST}$ enhances the voltage storing capacity of the transmissive LC capacitor $C_{LCT}$ and the reflective LC capacitor $C_{LCR}$.

When a potential difference is generated between both ends of the transmissive LC capacitor $C_{LCT}$ and the reflective LC capacitor $C_{LCR}$, an electric field is created perpendicular to the surfaces of the panels 100 and 200. In response to the electric field, LC molecules in the LC layer 3 are aligned perpendicular to the electric field, and polarization of the light passing through the LC layer 3 is varied depending on the orientations of the LC molecules. The polarizers convert light polarization into light transmittance.

Meanwhile, in a transreflective LCD, there are transmission areas TA defined by the transparent electrodes 192 and reflection areas RA defined by the reflective electrodes 194. In more detail, a transmission area TA means a section consisting of portions disposed above and below the transmissible electrode 192 in the TFT array panel 100, the common electrode panel 200, and the liquid crystal layer 3, while a reflection area RA means a section consisting of portions disposed above and below the reflective electrode 194. In the transmission areas TA and the reflection areas RA, cell spaces between the TFT array panel 100 and the common electrode panel 200 are uniformly formed.

The contact assistants 81 and 82 are made of a transparent conductor such as ITO or IZO, or a reflective metal such as Al, Ag, Cr, or alloys thereof, and are connected to the end portions 129 of the gate lines 121 and the end portions 179 of the data lines 171 through the contact holes 181 and 182, respectively. The contact assistants 81 and 82 supplement adhesion between the exposed end portions 129 and 179 and exterior devices, and protect them. In the case that the gate drivers are integrated into the panel, the contact assistants 81 may function as connection elements between the end portions 129 of the gate lines 121 and the gate drivers, but they may be omitted in other embodiments.

The common electrode panel 200, facing the TFT array panel 100, is configured as follows.

A light blocking member (not shown) called a "black matrix" is provided on an insulating substrate 210 made of transparent glass or plastic. The light blocking member 220 has aperture regions facing the transparent electrodes 192 and the reflective electrodes 194, and having the same shapes as the transparent electrodes 192 and the reflective electrodes 194. Otherwise, the light blocking member may consist of portions corresponding to the gate lines 121, the date lines 171, and the TFTs. The light blocking member may be configured as a single layer of Cr or a double layer of Cr and chromium oxide. Otherwise, it may be configured as an organic layer with black pigments.

A plurality of color filters (not shown) are formed on the substrate 210 and the light blocking member. Most of them are placed within the aperture regions delimiting by the light blocking member. Each color filter is placed between two adjacent data lines 171 in a vertical direction, exhibiting one among red, green, blue, and white colors. The color filters 230 are connected to one another, having the shape of stripes.

The light blocking member and the color filters, however, may be provided on the TFT array panel 100.

An overcoat layer (not shown) is formed on the light blocking member and the color filters to prevent the color filters from being exposed. This overcoat layer has a flat top surface.

A plurality of protrusion groups, made of an organic material, is formed on the substrate 210. Each protrusion group consists of four protrusions 281, 282, 283, and 284. The protrusion 281 includes a vertical portion facing the central vertical line 194b of the reflective electrode 194 and extending along the same, and a branch-shaped portion facing the expansion 194a of the reflective electrode 194. The protrusions 282 and 283 extend in a vertical direction, positioned with the branch-shaped portion of the protrusion 281 in the center of the two protrusions 282 and 283, and facing the expansion 194a of the reflective electrode 194. The protrusion 284 faces the horizontal line 194d of the reflective electrode 194, while extending along the same. The protrusions 281, 282, 283, and 284 are formed more narrowly than the reflective electrode 194, while being overlapped therewith. Most of the ends of the protrusions 281, 282, 283, and 284 are shaped as funnels.

A common electrode 270 made of a transparent conductor such as ITO or IZO is formed on substrate 210 having the protrusions 281, 282, 283, and 284. The common electrode 270 partially protrudes along the protrusions 281, 282, 283, and 284.

The protrusions 281, 282, 283, and 284 may be formed on the common electrode 270.

The number and/or the size of the protrusions 281, 282, 283, and 284 may be controlled depending on design factors, such as the size of the reflective electrode 194, the ratio between the vertical side and horizontal side, the kind of the liquid crystal and characteristics thereof, etc.

Polarizers (not shown) are individually provided on the outer surfaces of the panels 100 and 200, and alignment layers (not shown) are individually provided on the inner surfaces of the panels 100 and 200.

The LC layer 3 includes negative dielectric anisotropy LC molecules that are aligned perpendicular to the surface of the two panels 100 and 200 in the absence of an electric field.

When the common electrode 270 is supplied with a common voltage and the pixel electrode is supplied with a voltage, an electric field, which is perpendicular to the surfaces of the two panels 100 and 200, is generated in the LC layer 3. In response to the electric field, the LC molecules begin to change their orientation to be perpendicular to the direction of the electric field.

At this time, the protrusions 281, 282, 283, and 284 offer some horizontal components to the electric field generated in the LC layer 3, or some pre-tilts to the LC molecules. Furthermore, the edges of the transparent electrode 192 and the reflective electrode 194 offer some horizontal components to the electric field, so that the LC molecules are aligned to be perpendicular to the sides of the transparent electrode 192. As shown in FIG. 3, horizontal sides of the upper part of the transparent electrode 192 and the projection 284 are parallel, vertical sides of the lower part of the transparent electrode 192 and the protrusion 281 are parallel, and vertical sides of the expansion 194a of the reflective electrode 194 are parallel to the protrusions 282 and 283, and the two branches of the protrusion 281. In this case, the LC molecules are aligned in four directions. As a result, nine domains, delimited by the projections 281, 282, 283, and 284, and having different orientations, are formed in the LC layer 3, and the viewing angle of the LCD becomes wider. In this structure, the chamfered corners of the transparent electrode 192 and the inward-constricted portions in the vicinity of the storage electrode line 131, and the slant sides of the protrusions 281, 282, 283, and 284 prevent the tilt directions of the LC molecules from being suddenly changed between the domains.

Hereinafter, light efficiency characteristics of the above-mentioned LCD will be described with reference to FIG. 6.

Figure 6:
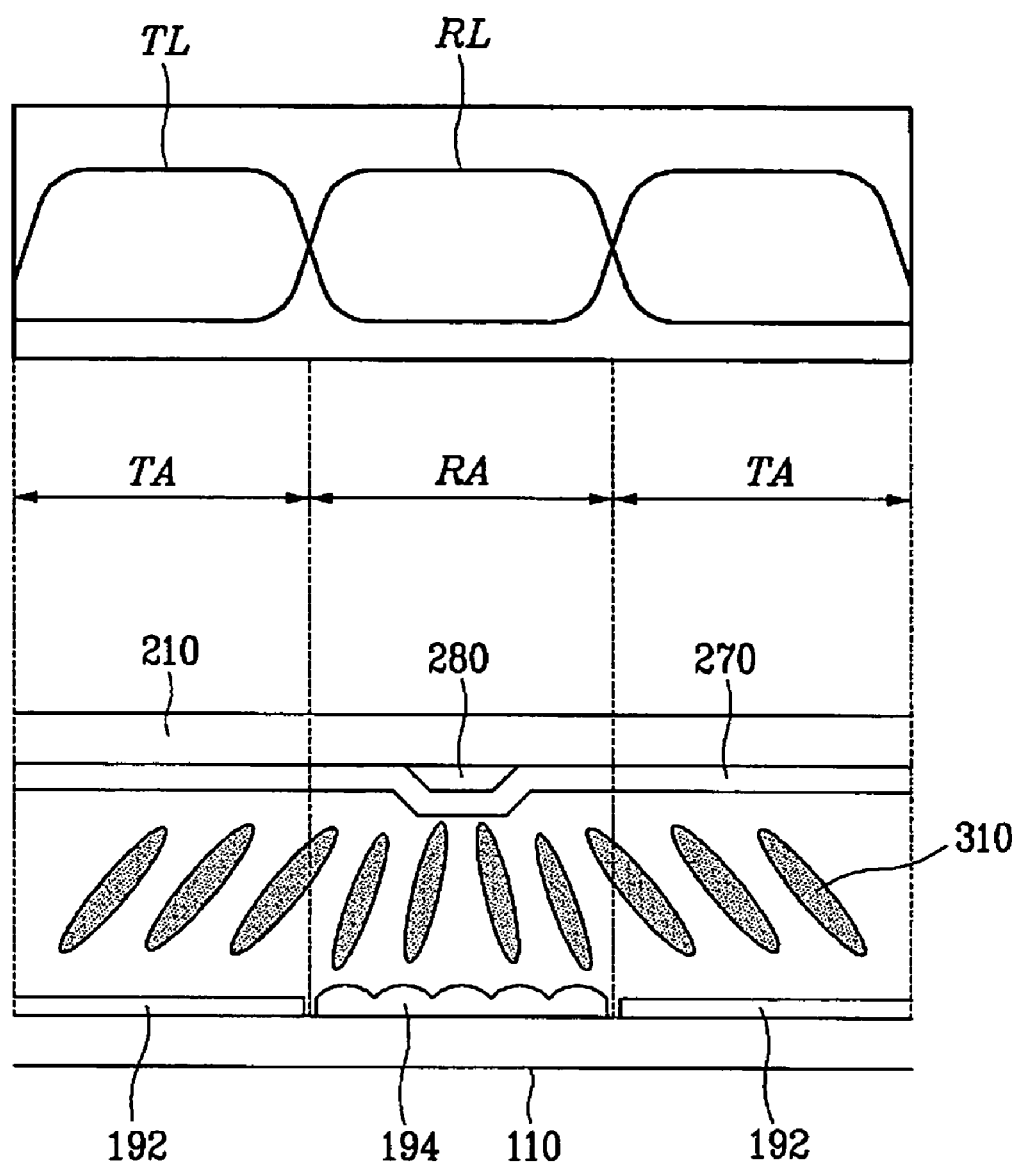
FIG. 6 is a schematic cross-sectional view showing a profile of transmission luminance and reflection luminance of the LCD shown in FIG. 3 through FIG. 5.

FIG. 6 is a schematic cross-sectional view showing a profile of transmission luminance and reflection luminance of the LCD discussed with FIG. 3 through FIG. 5.

In FIG. 6, reference numeral 280 is a protrusion formed under the common electrode 270, abbreviation RA is a reflection area with a reflective electrode 194, TA is a transmission area with a transparent electrode 192, RL is a reflection luminance, and TL is a transmission luminance.

FIG. 6 shows that the reflection luminance RL of the reflection area RA with the protrusion 280 is very high, differing from the typical prior art which is incapable of contributing to the display in this area.

In this way, the transflective LCD according to an embodiment of the present invention utilizes the projections 281, 282, 283, and 284 in the reflection areas RA to realize a multi-domain structure with higher reflection efficiency.

Figure 7:
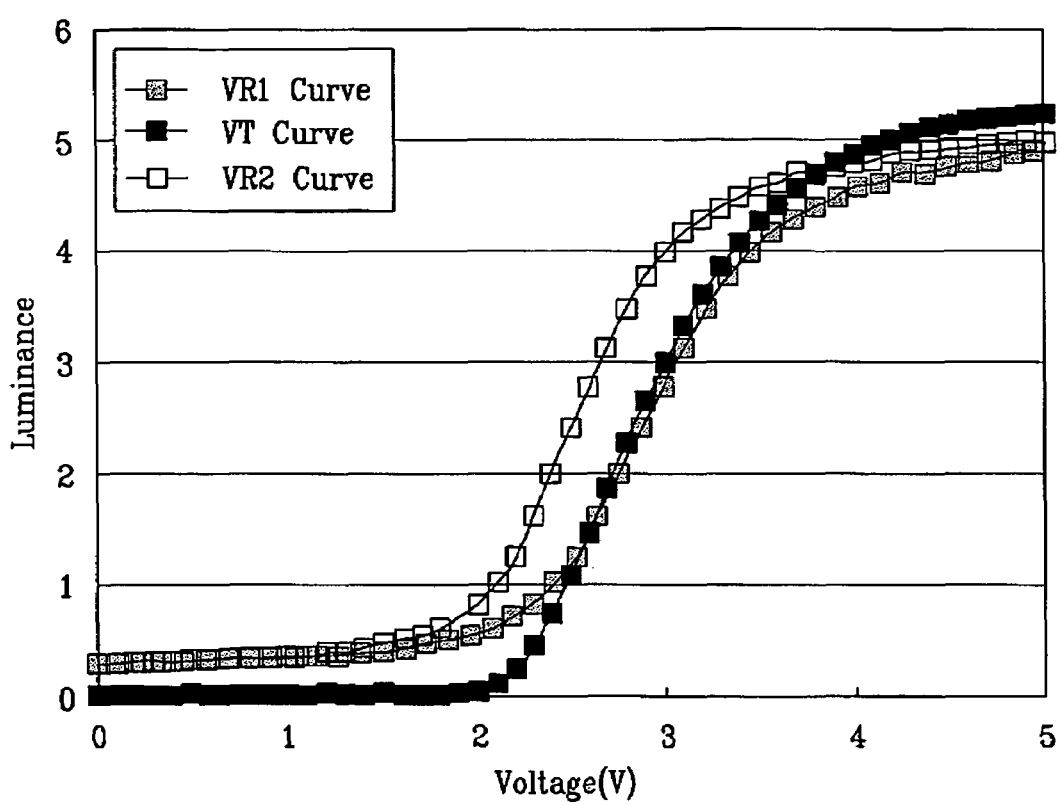
FIG. 7 is a graph showing actually measured transmittance and reflectance from the LCD shown in FIG. 3 through FIG. 5.

FIG. 7 is a graph showing actually measured transmittance and reflectance from the LCD previously discussed with FIG. 3 through FIG. 5.

In the graph of FIG. 7, a horizontal axis represents "a voltage difference" between a voltage applied to a drain electrode 175 via a TFT and a common voltage $V_{com}$, and a vertical axis represents "intensity" (i.e., luminance). In addition, VT is a curve of transmittance for the transmission area TA, VR1 is a curve of reflectance for the reflection area RA, and VR2 is a curve of reflectance for the reflection area RA when the auxiliary capacitor $C_{AUX}$ is eliminated from the LCD.

Referring to the curve VR2, a threshold voltage, a point where ascent of luminance begins, is lower than those of reflectance curves for typical LCDs without protrusions. This is because profiles of the protrusions 281, 282, 283, and 284 force the LC molecules to move more rapidly. For the same reason, a saturation voltage, a point that luminance reaches the maximum level and maintains the same level, is also relatively low.

As previously mentioned, when the auxiliary capacitor $C_{AUX}$ is connected to the reflective LC capacitor $C_{LCR}$ in series, the reflective LC capacitor $C_{LCR}$ receives the lowered voltage by the auxiliary capacitor $C_{AUX}$. For this reason, in order for the LCD with such an auxiliary capacitor to exhibit the same luminance as the LCD having no auxiliary capacitor, a higher data voltage should be supplied to the auxiliary capacitor $C_{AUX}$. In this case, the auxiliary capacitor $C_{AUX}$ shifts the curve VR2 to the right, so that the curve VR1, which almost agrees with the curve VT, is obtained.

In other words, the two curves VT and VR1 can accord with each other by controlling capacitance of the auxiliary capacitor $C_{AUX}$. At this time, the capacitance of the capacitor $C_{AUX}$ is dependent upon the overlap dimension and distance between the coupling electrode 177 and the auxiliary electrode 126.

Meanwhile, since the voltage across the transmissive LC capacitor $C_{LCT}$ is different from the voltage across the reflective LC capacitor $C_{LCR}$, LC molecules of the reflection area RA and the transmission area TA are aligned at different tilt angles from each other, so that luminance of the two areas RA and TA becomes different. In this case, however, the images when viewed from the sides can be closer to the images when viewed from the front by suitably controlling the capacitance of the auxiliary capacitor $C_{AUX}$, thus improving side visibility.

The LCD of the present invention utilizes the protrusions formed at the reflective area and the auxiliary capacitor connected to the reflective capacitor in series to accord compatible the reflectance and transmittance curves for the reflection area and the transmission area having the same cell gaps. As a result, the light efficiency becomes higher and the viewing angle becomes wider.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

What is claimed is:

1. A liquid crystal display comprising:
   a first substrate;
   a transparent electrode formed on the first substrate;
   a coupling electrode formed on the first substrate and connected to the transparent electrode;
   a reflective electrode formed on the first substrate and separated from the transparent electrode;
   an auxiliary electrode formed on the first substrate and connected to the reflective electrode, the auxiliary electrode overlapping the coupling electrode with a dielectric layer interposed between the auxiliary electrode and the coupling electrode;
   a second substrate facing the first substrate;
   a liquid crystal layer interposed between the first substrate and the second substrate; and
   a protrusion formed on the second substrate.

2. The liquid crystal display of claim 1, wherein the protrusion is formed in areas of the second substrate facing and opposite to the reflective electrode on the first substrate.

3. The liquid crystal display of claim 2, wherein the reflective electrode is formed wider than the protrusion.

4. The liquid crystal display of claim 3, wherein the reflective electrode symmetrically divides the entire transparent electrode or a partial portion of the transparent electrode.

5. The liquid crystal display of claim 1, further comprising an insulating layer between the coupling electrode and the auxiliary electrode, the insulating layer being the dielectric layer.

6. The liquid crystal display of claim 5, further comprising a switching element formed on the first substrate and having an output terminal electrode connected to the coupling electrode.

7. A liquid crystal display comprising:
   a first panel having a reflective electrode and a transparent electrode;
   a second panel facing the first panel;
   a liquid crystal layer interposed between the first panel and the second panel; and
   an element formed in the second panel for defining tilt direction of liquid crystal molecules in the liquid crystal layer, wherein the reflective electrode and the transparent electrode are separated from each other.

8. The liquid crystal display of claim 7, wherein the transparent electrode and the reflective electrode receive different voltages.

9. The liquid crystal display of claim 8, further comprising an auxiliary capacitor connected to the reflective electrode and the transparent electrode.

10. The liquid crystal display of claim 7, wherein the tilt direction-defining element comprises at least a protrusion pattern.

11. The liquid crystal display of claim 10, wherein the protrusion pattern comprises a first protrusion and a second protrusion that extend along the same direction as the reflective electrode.

12. The liquid crystal display of claim 7, wherein the tilt direction-defining element is formed in areas of the second panel facing and opposite to the reflective electrode on the first panel.

13. A liquid crystal display comprising:
    a plurality of pixels, wherein each of the pixels comprises:
       a liquid crystal layer;
       a transmissive liquid crystal capacitor;
       a reflective liquid crystal capacitor separated from the transmissive liquid crystal capacitor; and
       a tilt direction-defining element that determines tilt direction of liquid crystal molecules in the liquid crystal layer, and
       wherein a voltage across the transmissive liquid crystal capacitor is different from a voltage across the reflective liquid crystal capacitor.

14. The liquid crystal display of claim 13, wherein the tilt direction-defining element comprises at least a protrusion pattern.

15. The liquid crystal display of claim 13, wherein the voltage across the transmissive liquid crystal capacitor is higher than the voltage across the reflective liquid crystal capacitor.

16. The liquid crystal display of claim 15, further comprising an auxiliary capacitor connected to the reflective liquid crystal capacitor.

17. The liquid crystal display of claim 16, further comprising a switching element connected to the transmissive liquid crystal capacitor and the auxiliary capacitor, wherein the transmissive liquid crystal capacitor receives a data voltage from the switching element, while the reflective liquid crystal capacitor receives a voltage lower than the data voltage from the auxiliary capacitor.

18. The liquid crystal display of claim 17, wherein the transmissive liquid crystal capacitor comprises a transparent electrode, connected to the switching element, and a common electrode that receives a common voltage, while the reflective liquid crystal capacitor comprises a reflective electrode, separated from the transparent electrode, and the common electrode.

19. The liquid crystal display of claim 18, wherein the auxiliary capacitor is formed by overlapping at least one of the transparent electrode and an output terminal electrode of the switching element that is connected to the transparent electrode with either the reflective electrode or an auxiliary electrode connected to the reflective electrode.

20. A liquid crystal display comprising:
    a first substrate;
    a gate line formed on the first substrate;
    a first insulating layer formed on the gate line;
    a data line formed on the first insulating layer;
    a drain electrode that is formed on the first insulating layer, while being separated from the data line;
    a second insulating layer that is formed on the data line and the drain electrode and is provided with a first contact hole;
    a transparent electrode that is formed on the second insulating layer, while being connected to the drain electrode through the first contact hole;
    an auxiliary electrode formed on the first substrate and overlapping at least one of the transparent electrode and the drain electrode;
    a reflective electrode that is connected to the auxiliary electrode, while being separated from the transparent electrode;

a second substrate facing the first substrate;
a liquid crystal layer interposed between the first substrate and the second substrate; and
a protrusion pattern that is formed on the second substrate and is formed in areas of the second substrate facing and opposite to the reflective electrode.

21. The liquid crystal display of claim 20, wherein the auxiliary electrode underlies the first insulating layer.

22. The liquid crystal display of claim 21, wherein the first and second insulating layers are provided with a second contact hole, through which the auxiliary electrode is exposed, and the reflective electrode is connected to the auxiliary electrode through the second contact hole.

23. The liquid crystal display of claim 22, wherein the drain electrode has an aperture, and the second contact hole is formed to penetrate the aperture.

24. The liquid crystal display of claim 20, wherein the second insulating layer has an uneven top surface.

25. The liquid crystal display of claim 20, wherein the protrusion pattern comprises a first protrusion and a second protrusion that extend along the same direction as the reflective electrode.

26. The liquid crystal display of claim 20, wherein the protrusion pattern is formed as a bar with a funnel-shaped end.

27. The liquid crystal display of claim 20, further comprising a common electrode formed on the protrusion pattern.

* * * * *